United States Patent [19]

Richert

[11] Patent Number: 4,526,397
[45] Date of Patent: Jul. 2, 1985

[54] ELECTRONIC SAFETY SKI BINDING HAVING OBLIQUE, ORTHOGONAL TRANSDUCERS

[75] Inventor: Manfred Richert, Munich, Fed. Rep. of Germany

[73] Assignee: Marker International Company, Salt Lake City, Utah

[21] Appl. No.: 431,230

[22] Filed: Sep. 30, 1982

[30] Foreign Application Priority Data

Oct. 9, 1982 [DE] Fed. Rep. of Germany ....... 3140218

[51] Int. Cl.³ .............................................. A63C 9/08
[52] U.S. Cl. ..................................... 280/612; 280/613
[58] Field of Search ............... 280/612, 613, 617, 618; 73/862.02, 862.04

[56] References Cited

U.S. PATENT DOCUMENTS

| | | | |
|---|---|---|---|
| 3,797,844 | 3/1974 | Smolka et al. | 280/617 |
| 3,942,809 | 3/1976 | Sittmann | 280/613 |
| 4,141,570 | 2/1979 | Sudmeier | 280/618 X |
| 4,291,894 | 9/1981 | D'Antonio et al. | 280/612 |
| 4,294,460 | 10/1981 | Kirsch | 280/617 X |
| 4,371,188 | 2/1983 | Hull | 280/613 |
| 4,383,702 | 5/1983 | Salomon | 280/613 X |
| 4,385,773 | 5/1983 | Scheck et al. | 280/612 |

Primary Examiner—Joseph F. Peters, Jr.
Assistant Examiner—Michael Mar
Attorney, Agent, or Firm—Woodling, Krost, Rust and Hochberg

[57] ABSTRACT

An electronic ski binding including orthogonal, obliquely mounted transducers for detecting oblique components of skiing forces applied to the binding. The binding may include isolation means for structure the transducers from the effects of ski bending. A means of mechanical compensation for the forces applied to the binding by the leaning of a skier may be included. A pivoted linkage between a sole plate and base plate of the binding may compensate for leaning forces by varying the portion of the force applied to the binding that is transmitted to the transducers depending upon the degree and direction of leaning by a skier.

17 Claims, 3 Drawing Figures

ELECTRONIC SAFETY SKI BINDING HAVING OBLIQUE, ORTHOGONAL TRANSDUCERS

BACKGROUND OF THE INVENTION

The present invention relates to electronic safety ski bindings. A safety ski binding is attached to a ski and, in turn, releasably grips a ski boot worn by a skier. The safety feature is activated to release the ski boot, during skiing, when skiing-induced forces exerted on a skier's leg reach a level that endangers the well-being of the skier. Mechanical sensing of the skiing forces and activation of the release mechanism of a safety ski binding are well known. More recently, electronic means have been disclosed for sensing the skiing forces, producing electrical signals corresponding to the forces and electronically processing the signals to make a determination as whether binding release is appropriate. See U.S. Pat. No. 4,291,894 issued Sept. 29, 1981 to D'Antonio and Bates.

The transducers used in electronic ski bindings to sense forces and to generate electrical force signals in response, detect all skiing forces that result in an application of stress to them. The object of including the transducers in the binding is to detect only the forces applied to the leg of a skier using the binding to determine whether the safety of the skier is threatened. If the electrical force signals exceed a predetermined threshold, indicating a threat to the skier, an electrical release signal is generated causing the binding to release.

Transducers are positioned in a ski binding to measure longitudinal and vertical forces, i.e., forces along the length of the ski and perpendicular to it, respectively. This positioning limits flexibility in designing a binding. Therefore it is desirable to provide other transducer mountings to increase the number of design alternatives for electronic bindings.

To the extent force signals are generated in response to forces which do not threaten the skier, erroneous indications are produced and the binding may release prematurely. The forces which a skier may tolerate depend upon whether he is standing straight or leaning forwards or backwards. When a skier leans, particularly backward, large forces may be detected, but the skier can tolerate more force safely. Leaning also causes flexing of the ski. Unless the stress induced by ski flexing is relieved, the transducers detect it as a force applied to the skier's leg. If the threshold for generation of a release signal is fixed, then a skier who is leaning may cause a binding to release when there is no threat to his safety. Therefore, it is desirable to vary the release threshold in response to leaning by a skier.

SUMMARY OF THE INVENTION

In the present invention transducers in an electronic ski binding are mounted orthogonally, i.e., the axes along which force is measured are mounted to form a 90 degree angle between them. The axes are obliquely oriented with respect to the surface of the ski so that a vertical force is resolved into two components for detection by the transducers. A separate transducer detects each of the force components and generates a electrical signal which is further processed. The mounting of transducers orthogonally and obliquely permits a wide variety of binding designs compared to a limitation of mounting the transducers so that only longitudinal and vertical forces are detected. By detecting the force components in oblique directions with respect to the ski, the leaning of a skier produces only small changes in the detected forces or torques. As a result, apparent increases in applied torques caused by leaning and which do not threaten the skier's safety are not reflected in the force signals produced by the transducers and do not cause premature binding release.

The flexing of the ski caused by the leaning of a skier is isolated from the orthogonal transducers by slidably mounting the base plate of the binding on the ski. With a slidable mounting, the base plate of the binding may remain rigid while the ski bends. In one embodiment, the slidable attachment may include an elongated transverse hole in the base plate, i.e., across the width of the ski. The hole is longitudinally elongated, i.e., elongated along the length of the ski. In this embodiment, a pin or wire bent in a U-shape passes through the hole and has its arms anchored in the ski by conventional means such as by screws or screw threads. This embodiment allows the end of the base plate to slide while being held down against the ski by the wire or pin.

In a different embodiment of the invention, separate toe and heel base plates of the binding are mounted to the ski and to a single sole plate. The toe base plate is connected to the sole plate by a linkage, pivotally mounted at each end to the sole plate and base plate, respectively. The linkage bears on the orthogonally mounted transducers which are attached to the sole plate. When the skier leans, the linkage pivots changing the angle at which the components of the forces are applied to the transducers. As a result, the transducers are relatively isolated from and produce relatively little response to the leaning forces. In effect, the release threshold of the inventive binding is mechanically varied to compensate for non-threatening leaning forces.

DETAILED DESCRIPTION OF PREFERRED EMBODIMENTS

In the ski binding art it is well-known that the weakest point along a skier's leg lies in the area of the leg just above the ski boot top. Torques applied to the skier's leg may be measured with reference to this area. Generally the area is located somewhat above the skier's ankle. It is convenient to define a transverse axis, i.e., an axis across the width of the ski, at such a location on the skier's leg for making measurements of forces and torques exerted by skiing. A published example of measurement of torques and forces with reference to such an axis is provided in German Offenlegungschrift No. 29 48 277, published June 11, 1981. In that disclosure, at least two transducers are provided for generating electrical signals in response to the application of skiing forces to them. One transducer is placed to detect longitudinal forces, i.e. forces applied along the length of the ski, and another transducer is placed to detect vertical forces, i.e. forces applied generally perpendicular to the surface of the ski.

Figure 1:
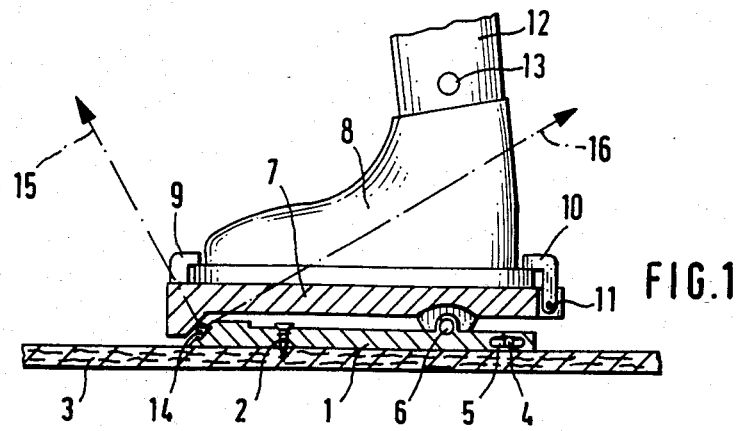
FIG. 1 is a cross sectional, schematic side view of a ski binding according to an embodiment of the invention.

In FIG. 1 a cross sectional view of a ski binding according to the invention is shown. A base plate 1 is attached by a screw 2 to a ski 3 (only a portion of ski 3 is shown). A hole 5 in base plate 1 at the rear or heel portion of the base plate is elongated in a longitudinal direction, i.e., in a direction along the length of ski 3. A transverse rod or wire 4 having arms (not shown) bending in the direction of and attached to ski 3, passes through hole 5. Hole 5 and rod 4 form a slidable attachment between the heel end of base plate 1 and ski 3. A transverse axle 6 forms a pivotal interconnection of base plate 1 with a sole plate 7. Axle 6 preferably lies beneath the heel of a ski boot mounted in the binding. Sole plate 7 receives a ski boot 8 and engages the sole of boot 8. A toe piece 9 attached to sole plate 7 grasps the toe portion of the sole of boot 8 and restrains it toward sole plate 7. A releasable heel piece 10 is pivotally connected along an axle 11 to sole plate 7. When heel piece 10 is latched, as shown, it grasps the heel portion of the sole of ski boot 8 and restrains it toward sole plate 7. When an electrical release signal is generated, heel piece 10 is released, i.e., pivoted around pivot 11 away from the sole of boot 8, so that the heel of boot 8 is no longer restrained. That is, the binding releases boot 8 so that they may separate from each other.

A portion of a skier's leg 12 is shown projecting from boot 8. A transverse axis 13, along the most vulnerable portion of the skier's leg, is indicated on leg 12. It is about axis 13 which torque and forces are desirably measured to accurately detect danger.

At its toe end, base plate 1 contains a portion that is oblique with respect to the sole of ski boot 8. Two transducers 14 are mounted orthogonally on that oblique portion. That is, one transducer is mounted with its pressure axis, i.e., the axis along which an exerted force will be detected by the generation of an electrical signal, perpendicular to the oblique surface of base plate 1, in a direction 15. The other transducer is mounted with its pressure axis parallel to the oblique surface, i.e., in a direction 16. Sole plate 7 includes an oblique surface, generally parallel in the quiescent binding to the oblique surface of base plate 1, that bears on transducers 14. The forces transmitted between the sole and base plates are the forces detected by transducers 14.

In use, ski 3 flexes as the skier skis. The slidable connection between base plate 1 and ski 3 allows flexing of ski 3 while sole plate 1 remains straight. Rod 4 allows the heel end of base plate 1 to move, relatively, toward the ski heel or tip as ski 3 flexes. Skiing forces cause pivoting of the sole plate on axle 6 with the result that various vertical forces are applied to and detected by transducers 14.

The vertical forces which are applied by the pivoting of sole plate 7 are resolved into oblique components along directions 15 and 16, respectively, by the generation of force signals. These signals may be converted electronically to represent the torques applied to the skier's leg at transverse axis 13 by multiplying them by the lengths of their respective moment arms, i.e., the distances from axis 13.

In the electronic ski binding configurations shown in German Offenlegungschrift No. 29 48 277, previously referred to, two transducers are generally mounted orthogonally, but not obliquely. The pressure axis of one transducer is mounted longitudinally as indicated by the direction 16' in FIG. 1; the pressure axis of the other transducer is mounted vertically, i.e., perpendicular to the surface of the ski as shown by direction 15' in FIG. 1. By requiring the transducers to be mounted for direct longitudinal and vertical force detection, it is necessary that they be disposed beneath and at one end of the sole plate. As a result, the number of configurations in which the binding may be designed and transducers located is severely reduced. However, by mounting the transducers with their pressure axes oblique with respect to the surface of the sole plate on which a ski boot is received, the number of design choices is greatly increased. For example, although the embodiment of FIG. 1 shows the orthogonal, oblique sensors mounted at the toe of the binding, they may also be mounted at the heel or another location determined by binding design considerations other than transducer positioning.

Figure 2:
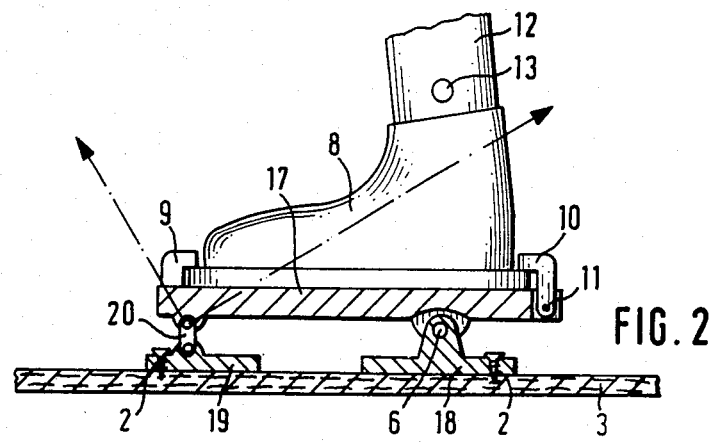
FIG. 2 is a cross sectional, schematic side view of a ski binding according to an embodiment of the invention.
Figure 3:
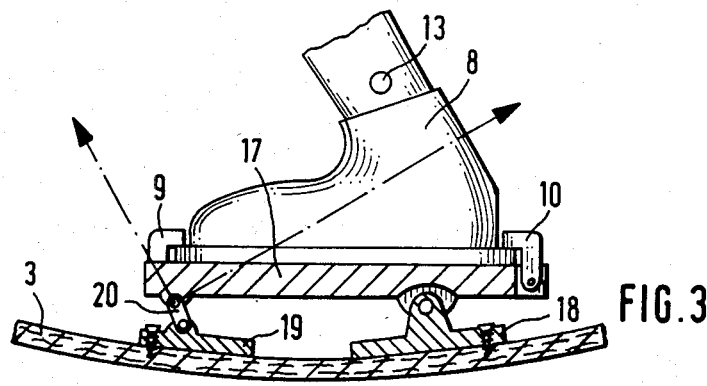
FIG. 3 is a cross sectional, schematic side view of the embodiment of a ski binding shown in FIG. 2 mounted on a flexed ski.

Another embodiment of the inventive binding is shown in FIGS. 2 and 3. Like elements from FIG. 1 are given the same reference numerals. In FIGS. 2 and 3, a portion of a ski 3 is shown to which a heel base plate 18 and a toe base plate 19 are attached by screws 2. Base plates 18 and 19 replace the single base plate of FIG. 1. Toe base plate 19 is connected at its end opposite ski 3 to the toe end of a sole plate 17. The orthogonal transducers are mounted on the underneath side of sole plate 17 and one end of a link 20 bears on them. Except as described in this paragraph, the elements of the embodiment of FIGS. 2 and 3 are identical to those of FIG. 1, so that another description of those identical elements is unnecessary.

The embodiment of FIG. 2 includes a means of compensating for the torques created by leaning of a skier. First, the transducers are mounted orthogonally and obliquely to detect components of forces along directions 15 and 16, just as described for the embodiment of FIG. 1. Second, link 20 permits relative motion of toe base plate 19 and heel base plate 18 when ski 3 flexes as shown in FIG. 3. The movement of link 20 therefore isolates the transducers from the effects of ski bending.

In addition, the movement of link 20 adjusts the angle at which pressure is applied to the transducers by it. FIG. 3 illustrates the position of link 20 under the influence of a skier leaning forward. FIG. 2 illustrates the position of link 20 under the influence of a backward lean. Because the direction in which force is exerted on the transducer changes as link 20 moves, the fraction of the force transmitted changes depending upon the position of link 20. In FIG. 2, link 20 reacts to applied forces in a vertical direction, whereas the transducers are sensitive in oblique directions. Therefore, only a fraction of the applied force is transmitted to the transducers. By contrast, in FIG. 3, link 20 is more directly aligned with the pressure axes of the transducers and, as compared to FIG. 2, a greater fraction of the applied force is transmitted to the transducers.

Therefore, in contrast to the known bindings, in the inventive binding there is little effect of skier leaning on the measured torques. The oblique force detection in combination with the moveable linkage for applying detected forces to the transducers compensates for leaning forces. In effect, it mechanically varies the release threshold to compensate for leaning forces. This compensation is particularly important for extreme backward leaning by a skier. In that situation, the skier's leg is supported at the heel edge of the ski boot and the maximum force or torque is exerted at a location well above axis 13, the most susceptible point for injury. No danger is presented by forces exceeding the danger threshold for other ski postures and the inventive binding prevents unnecessary release of the binding by ignoring most of the leaning torque. Of course, if other force components require a binding release for the well-being of the skier, a release will occur in the inventive binding.

The invention has been described with respect to certain preferred embodiments. Various changes and additions within the spirit of the invention will occur to one of skill in the art. Accordingly, the scope of the invention is limited solely by the following claims.

I claim:

1. An electronic ski binding for electrically detecting the forces exerted on a skier's leg inserted in a ski boot latched in the binding, for generating electrical signals in response to the detected forces and for releasing a latched ski boot from the binding when the electrical signals exceed a predetermined threshold value, said binding comprising:

first base plate means for attaching the binding to a ski;
sole plate means for receiving the sole of a ski boot including a generally planar sole receiving surface;
interconnection means for movably interconnecting said first base plate means and said sole plate means;
orthogonal transducing means having first and second pressure axes;
mounting means associated with said sole plate means for mounting said transducer means to orient said first and second pressure axes perpendicular to each other and at an oblique angle which is substantially displaced from said sole plate means to cause said transducing means to generate electrical signals in the direction of said respective first and second pressure axes in response to the components of forces applied to said transducing means in said directions; and latch means mounted on said sole plate for securing said ski boot to said sole plate, said latch means being responsive to said electrical signals for releasing said ski boot.

2. The invention of claim 1 wherein said interconnection means comprises a pivotal connection between said first base plate means and said sole plate means.

3. The invention of claim 2 wherein said pivotal connection lies beneath the heel of the sole of a ski boot latched on said sole plate means.

4. The invention of claim 1 wherein said orthogonal transducing means comprises two transducers, each transducer generating an electrical signal in response to a force applied along a pressure axis of the transducer, wherein the transducers are mounted with their respective pressure axes generally perpendicular to each other.

5. The invention of claim 4 wherein said first base plate means includes an oblique surface to which said transducers are attached and said sole plate means includes an oblique surface bearing on said transducers.

6. The invention of claim 1 further including isolation means for isolating said transducing means from forces bending a ski to which said binding is attached.

7. The invention of claim 6 wherein said isolation means comprises slidable connection means for slidably connecting said first base plate to a ski.

8. The invention of claim 7 wherein said slidable connection means comprises a longitudinal aperture in said first base plate means and a rod passing through said aperture and attached to said ski.

9. The invention of claim 6 wherein said isolation means comprises second base plate means for attachment to said ski and to said sole plate means.

10. The invention of claim 9 further including a second interconnection means for movably interconnecting said second base plate means and said sole plate means.

11. The invention of claim 10 wherein said second interconnection means comprises a pivotal connection between said second base plate means and said sole plate means.

12. The invention of claim 1 including leaning force compensation means for varying the amount of a force applied to a binding that is transmitted to said orthogonal transducing means in response to leaning by a skier using the binding.

13. The invention of claim 12 wherein said leaning force compensation means comprises linkage means having first and second ends, said first end being pivotally connected to said first base plate means and said second end being pivotally connected to said sole plate means.

14. The invention of claim 13 wherein said second end of said linkage means bears upon said orthogonal transducing means.

15. The invention of claim 14 wherein said linkage means comprises a single link.

16. The invention of claim 14 wherein said orthogonal transducing means is mounted on said sole plate means.

17. The invention of claim 12 wherein said linkage means is mounted beneath the toe of the sole of a ski boot latched on said sole plate means.

* * * * *